United States Patent Office 2,945,921
Patented July 19, 1960

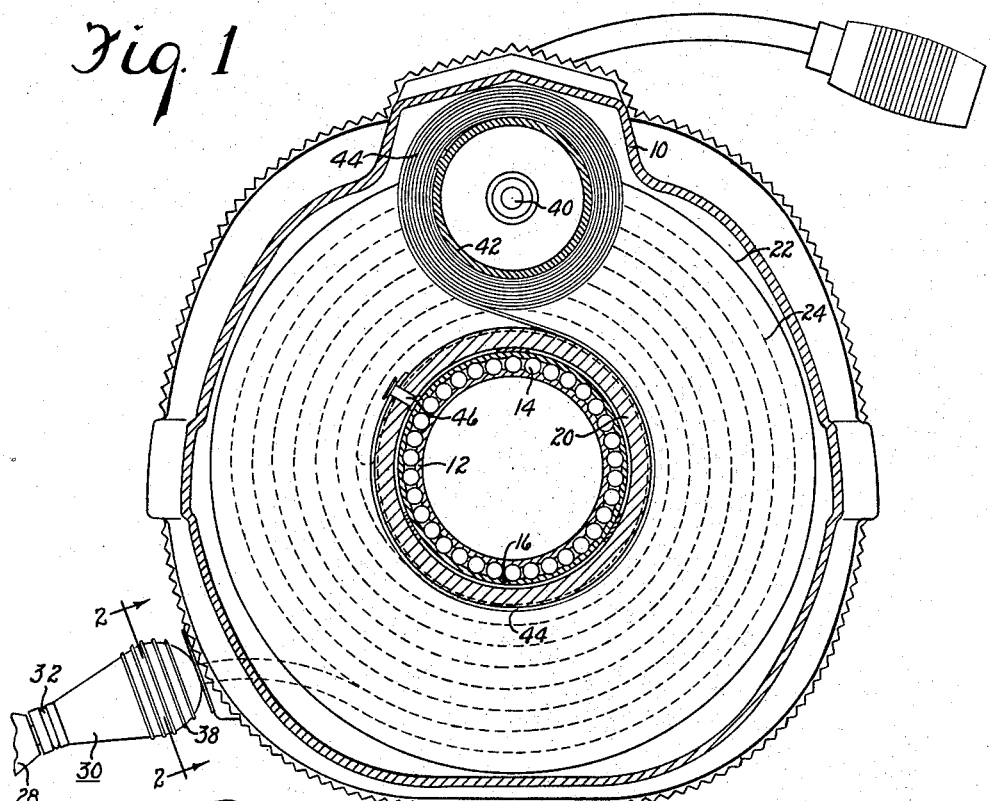
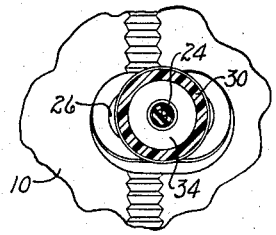
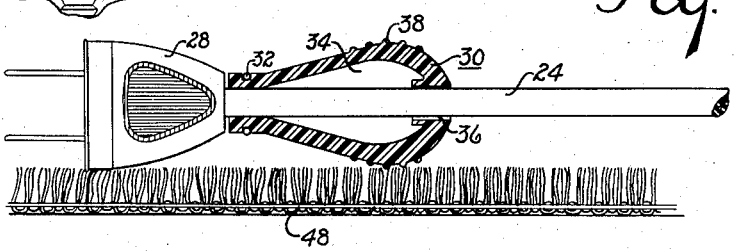

2,945,921

CORDWINDER BUMPERS

Michael E. Belicka, Greenwich, and Allen P. Cawl, New Canaan, Conn., assignors to Electrolux Corporation, Old Greenwich, Conn., a corporation of Delaware Filed May 18, 1959, Ser. No. 813,926

3 Claims. (Cl. 191—12.4)

Our invention relates to cordwinders and more particularly to a bumper for absorbing the shock produced by the sudden arresting of the rotation of the cordwinding drum when the cord is fully retracted.

Cordwinders for flexible electric cords are usually provided with a spring motor which is wound by the rotation of the winding drum during withdrawal of the cord, the spring motor thus being conditioned to rotate the drum for rewinding the cord. An ordinary spring motor having a spiral spring produces a maximum torque when fully wound, the torque dropping off as the spring becomes unwound. Consequently, the torque approaches a minimum value as the cord becomes fully rewound, with the result that the drum is rotating at a minimum speed at the end of the rewinding. The rotation of the drum is usually stopped by the plug on the electric cord striking the cordwinder housing, it being too large to pass through the cord opening in the housing, or by a bumper of relatively hard material slidably mounted on the cord, in the latter case the plug being relied on to limit the displacement of the bumper along the cord.

However, an improved rewinding action is obtained if a Negator® spring is employed to drive the winding drum. A spring of this nature is capable of producing a constant torque throughout the entire rewinding operation and consequently the winding drum does not slow down, but rather tends to increase its speed of rotation to a maximum value at the time the cord becomes fully rewound. This greatly increases the impact of the plug against the housing of the cordwinder, with the result that the electrical connection between the cord and the plug may be quickly damaged.

Consequently, it is among the objects of our invention to provide a bumper for absorbing this shock directly and without transmitting it to the electric plug at the end of the cord.

Another object of our invention is to incorporate in such bumper means for increasing the friction between the bumper and the surface, such as a rug, over which the cord and bumper are dragged during the rewinding operation.

Further objects and advantages of our invention will be apparent from the following description considered in connection with the accompanying drawings which form part of this application and of which:

Fig. 1 is a cross-sectional view of a cordwinder including a preferred embodiment of our invention;

Fig. 2 is a cross-sectional view taken on the line 2—2 of Fig. 1;

Fig. 3 is a view, partially in cross-section and on an enlarged scale of a portion of the device shown in Fig. 1.

Referring to the drawings, reference character 10 designates the housing of a cordwinder. Integral with or secured to the housing 10 is a central hollow shaft 12 which forms the inner race of a ball bearing 14. The outer race 16 of the bearing is secured in the hub 20 of a reel or winding drum 22. A flexible electric cord 24 has one end secured to the drum 22 and is adapted to be wound up thereon, as is shown in Fig. 1. The cord 24 extends through a preferably elongated opening 26 formed in the housing 10 in radial alignment with the drum 22 and the outer end of the cord is electrically and mechanically connected to an electric plug 28.

Secured around the cord 24 closely adjacent to the plug 28 is a bumper designated generally by reference character 30. The end of the bumper 30 adjacent to the plug 28 is formed with an annular recess in which is disposed a metal clamping ring 32 which serves to securely affix the bumper 30 to the cord 24 in a position spaced from the plug. The bumper is made of a flexible rubber-like material and through the greater portion of its length is provided with an air space 34 surrounding the cord 24. The opening 36 in the bumper at the end opposite from the clamping ring 32 is of slightly greater diameter than the outer diameter of the cord 24 so that the hollow space 34 is in communication with the atmosphere. The diameter of bumper 30 is greater than the minor dimension of opening 26, and hence cannot pass therethrough.

Preferably, the outer surface of the bumper 30 is formed with one or more annular ribs 38 disposed in a plane or planes normal to the lengthwise extent of the cord 24.

Rotatably mounted within the housing 10 on a shaft 40 is a spool 42 around which is wound a Negator® spring 44. The opposite end of spring 44 is secured to the hub 20 of the drum 22, as by the rivet 46. This spring is so formed that it tends to wrap itself tightly around the spool 42. However, when the reel 22 is rotated in a clockwise direction, as by pulling the cord 24 outwardly through the opening 26, the spring 44 is unwound from the spool 42 and is wound in a reverse direction around the hub 20, and the length of the spring is so chosen with respect to the length of the cord that when the latter is completely unwound from the drum 22 most of the spring is unwound from the spool 42 and wound up on the hub 20.

Under these conditions, the spring tends to rewind itself around the spool 42 and in doing so exerts a torque tending to rotate the drum 22 in a counterclockwise direction, and when the drum is released the spring causes it to rotate in this direction so as to retract and wind up the cord 24. Due to the nature of the spring 44, as above mentioned, the torque exerted thereby is the same regardless of the amount of spring remaining on the spool 42 throughout the entire rewinding operation. The more the cord is rewound, the less friction there is between the remaining unwound portion of the cord and the surface, usually the floor, across which it is dragged during the rewinding and hence there is a tendency for the winding drum to increase its speed of rotation. This means that the cord is traveling at a maximum speed, which may amount to 20 miles per hour, when it becomes fully rewound. Also, practically all of the cord being wound on and rotating with the drum, the mass and inertia of the latter is at a maximum, and experience has proved that if the plug 28 is relied upon to stop the drum 22, the resulting shock is sufficient to break the plug from the cord after a relatively few operations.

However, the bumper 30 strikes the material of the casing 10 surrounding the opening 26 and the resulting impact is transmitted directly to the cord 24 by virtue of the fact that the bumper is tightly clamped thereto by means of the ring 32 and is retained in spaced relation to the plug. Moreover, much of the shock is absorbed in the bumper itself due to its resilient nature and due to the fact that its interior is open to the atmosphere, thus preventing the building up of air pressure therein which would otherwise result from its deformation under impact.

Also, the rib or ribs 38 formed on the bumper materially increase the friction between it and the surface over which it is moved, particularly if the latter is a carpet or rug, as indicated by reference character 48 in Fig. 3. Consequently, these ribs tend to reduce the velocity at which the cord is traveling at the time the bumper arrests the rewinding movement, thus further reducing the impact.

While we have shown one or more or less specific embodiment of our invention, it is to be understood that this has been done for the purpose of illustration only and that the scope of our invention is not be limited thereby, but is to be determined from the appended claims.

What we claim is:

1. In a cordwinder, a housing, a winding drum rotatably mounted therein, a flexible electric cord having one end secured to said drum, a substantially constant torque spring motor for rotating said drum to wind said cord thereon, said housing being formed with an opening in radial alignment with said drum through which said cord runs during withdrawal and retraction, an electric plug secured to the other end of said cord, a hollow bumper made of yieldable resilient material surrounding said cord adjacent to said plug, said bumper being larger than said opening to thereby arrest retraction of said cord when the bumper strikes the portion of the casing surrounding said opening, and means for anchoring the end of said bumper adjacent to said plug to said cord independently of said plug so as to prevent transmission of impact from the bumper to the plug.

2. In a cordwinder, a housing, a winding drum rotatably mounted therein, a flexible electric cord having one end secured to said drum, a substantially constant torque spring motor for rotating said drum to wind said cord thereon, said housing being formed with an opening in radial alignment with said drum through which said cord runs during withdrawal and retraction, an electric plug secured to the other end of said cord, a hollow bumper made of yieldable resilient material surrounding said cord adjacent to said plug, means for anchoring the end portion of said bumper adjacent to said plug to said cord independently of said plug, the interior diameter of the remaining portion of said bumper being greater than the outer diameter of said cord to provide an air space therebetween, the outer diameter of said bumper being larger than said opening to thereby arrest retraction of said cord when the bumper strikes the portion of the casing surrounding said opening.

3. In a cordwinder, a housing, a winding drum rotatably mounted therein, a flexible electric cord having one end secured to said drum, a substantially constant torque spring motor for rotating said drum to wind said cord thereon, said housing having an opening in radial alignment with said drum through which said cord runs during withdrawal and retraction, an electric plug secured to the other end of said cord outside said housing, a bumper secured to said cord adjacent to and independently of said plug, said bumper being larger than said opening to thereby arrest retraction of said cord when the bumper strikes the portion of the casing surrounding said opening, and an annular rib on said bumper disposed in a plane substantially normal to the lengthwise extent of said cord for increasing the friction between said bumper and the surface over which it is dragged during retraction to thereby reduce its acceleration.

References Cited in the file of this patent

UNITED STATES PATENTS

| | | |
|---|---|---|
| 902,121 | Suiter | Oct. 27, 1908 |
| 1,975,419 | Grube | Oct. 2, 1934 |
| 2,063,799 | Fornelius et al. | Dec. 8, 1936 |
| 2,745,912 | Meyer | Mar. 15, 1956 |
| 2,833,027 | Foster | May 6, 1958 |